United States Patent [19]

Carter et al.

[11] Patent Number: 4,656,363
[45] Date of Patent: Apr. 7, 1987

[54] CIRCUITRY FOR CONTROLLING AUTOMOBILE HEADLIGHTS FROM WINDSHIELD WIPERS

[76] Inventors: Bruce T. Carter, Rte. 1, Box 76, Rougemont, N.C. 27572; Henry A. Isley, Rte. 1, Box 316C, Creedmoor, N.C. 27522

[21] Appl. No.: 700,476
[22] Filed: Feb. 11, 1985
[51] Int. Cl.$^4$ .............................................. H02G 3/00
[52] U.S. Cl. .............................. 307/10 LS; 307/10 R; 315/82
[58] Field of Search ......................... 307/10 LS, 10 R; 315/82

[56] References Cited

U.S. PATENT DOCUMENTS

| | | | |
|---|---|---|---|
| 3,600,596 | 8/1971 | Aloisantoni | 307/10 LS |
| 3,767,966 | 10/1973 | Bell | 307/10 LS |
| 4,337,400 | 7/1982 | Hahn | 307/10 LS |

OTHER PUBLICATIONS

J. Okolowicz, Delay Circuits to Keep Headlights on when Needed, Electronic Design, p. 114.

Primary Examiner—William M. Shoop, Jr.
Assistant Examiner—Sharon D. Logan
Attorney, Agent, or Firm—B. B. Olive

[57] ABSTRACT

Circuitry is provided for a vehicle which automatically turns on the vehicle's headlights during operation of the windshield wipers of the vehicle. A signal voltage is supplied to the circuit from either the power line to the wiper motor or, in the case of pneumatic wipers, through a pressure actuated switch mounted on the wiper motor air line. The signal voltage opens a first transistor, which through a voltage network opens a second power transistor. The power transistor then closes a circuit between the main and lighting circuit power lines of the vehicle.

11 Claims, 4 Drawing Figures

CIRCUITRY FOR CONTROLLING AUTOMOBILE HEADLIGHTS FROM WINDSHIELD WIPERS

DESCRIPTION

1. Technical Field

The invention relates to automobile lighting circuitry, and particularly to circuitry which causes vehicle headlights and, if desired, also the parking lights to be automatically activated during the operation of the vehicle's windshield wipers.

2. Background of the Invention

In recent years several states have passed laws requiring vehicle operators to drive with their headlights on during inclement weather such as rain and snow. These laws are premised on the facts that visibility is decreased during foul weather in both daytime and nighttime, and that vehicles with their headlights on become more visible to other drivers during any period of decreased visibility. With visibility so increased, as mandated by these statutes, the probability of an accident occuring during foul weather driving is decreased.

Unfortunately, instilling drivers with the habit of turning on their headlights is difficult even in states where the statutes so require. Many people simply forget, and out-of-state drivers unaware or unused to the law fail to comply. More seriously, many people decline to turn their headlights on during daytime foul weather for fear that they will forget to turn them off upon parking, with the ultimate result of a dead battery. The obvious result is a decline in roadway safety.

DISCLOSURE OF THE INVENTION

In accordance with the present invention, a transistorized circuit is provided which in the illustrated embodiments turns on a vehicle's headlights and parking lights when the vehicle's windshield wipers are activated, and turns the lights off when the wipers are turned off. Normal operation of the vehicle's headlights at night has no effect upon the vehicle's wipers. As a result, the visibility of a vehicle to other drivers is increased whenever weather conditions are such that the operator of that vehicle finds it necessary to use his windshield wipers. The invention operates the vehicle's headlights in a normal fashion even when the vehicle is equipped with intermittent, time-delay type wipers.

BEST MODE FOR CARRYING OUT THE INVENTION

Figure 1:
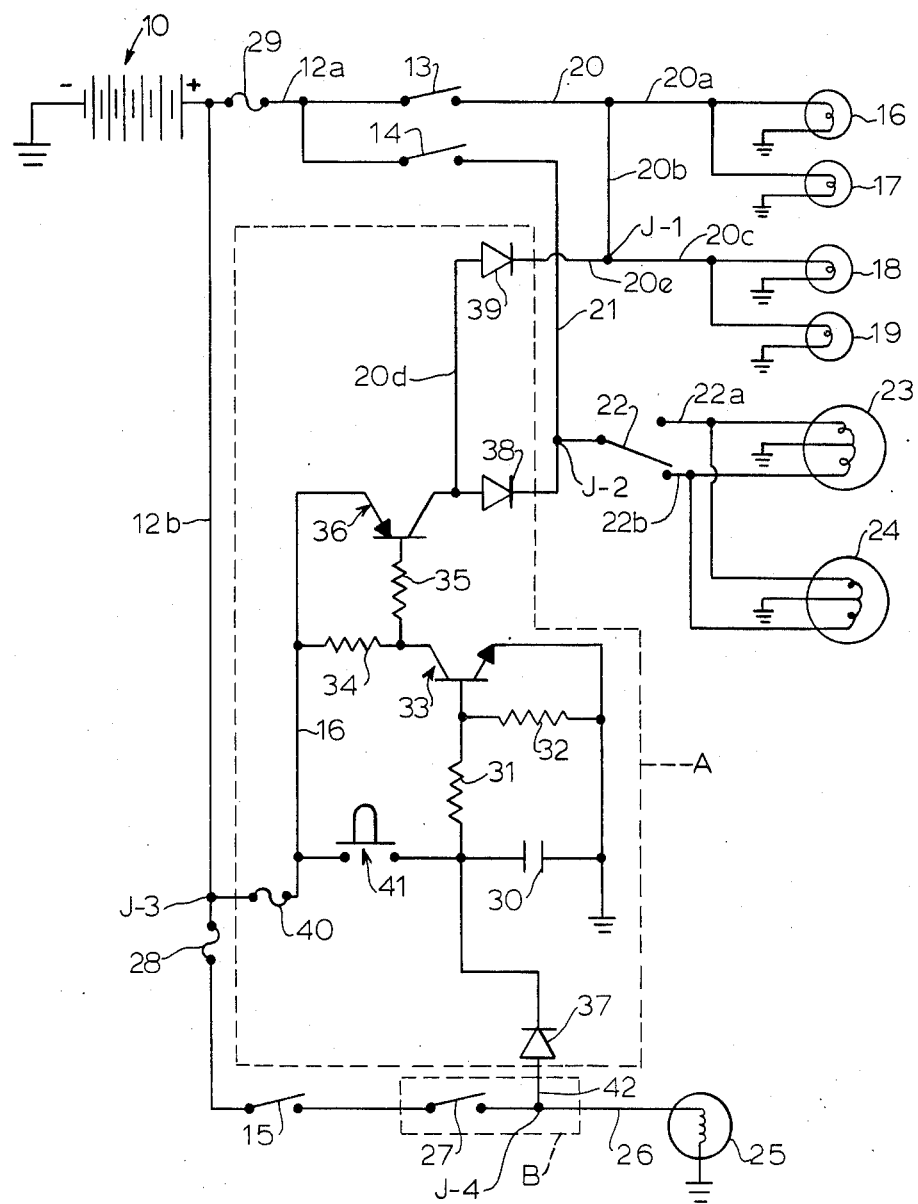
FIG. 1 depicts the circuitry of the invention, enclosed in Box A, connected to the windshield wiper, parking light and headlight circuitry, outside Box A, of a typical automobile or small truck and with the circuit which connects the power line to the windshield wiper motor being enclosed within Box B.

Making reference to FIG. 1, the lighting and windshield wiper circuit of a typical automobile or small truck comprises a 12-volt battery 10 connected by power line 12a to a parking light switch 13, a headlight switch 14, and by power line 12b to an ignition switch 15. When closed, the parking light switch 13 activates the front left and right parking lights 16, 17 and the rear left and right parking lights 18, 19 through the parking light power line 20 and connected lines 20a, 20b, 20c. When the headlight switch 14 is closed, the headlight power line 21 running to the dimmer switch 22 is energized. The dimmer switch selects, in the alternative, the high beam, line 22a, or low beam, line 22b, filaments of the vehicle headlights 23, 24 for operation.

Once the ignition switch 15 is closed, the windshield wiper motor 25 can be activated through the windshield wiper power line 26 by closing the wiper switch 27. The conventional circuit is protected by fuses 28, 29.

The added circuitry of the present invention, enclosed in Box A of FIG. 1, as illustrated in the FIG. 1 embodiment comprises a 1,200 microfarad D.C. capacitor 30, a 5,000 ohm resistor 31, a 22,000 ohm resistor 32, a 40 volt, 800 milliampere NPN transistor 33, a 1,200 ohm resistor 34, a 150 ohm resistor 35, a 160 watt, 80 volt, 20 ampere PNP transistor 36, a one ampere, 400 volt diode 37, and two 25 ampere, 400 volt diodes 38, 39. Also includesdin the preferred embodiment is a 20 ampere fuse 40 and a single-pole, single-throw, normally-open, momentary switch 41 of the push-button type. Connections are made at jucntion J-1 to the parking light circuit, at J-2 to the headlight circuit, at J-3 to power line 12b, and at J-4 to wiper motor power line 26.

The invention operates in the following manner. Diodes 37, 38 and 39 serve as circuit isolating devices. Transistor 33 serves as both an isolating and gain device and transistor 36 provides a power switching device. The triggering or signal voltage is detected at the J-4 junction connection point. When the ignition switch 15 is closed, closing the windshield wiper switch 27 applies a positive voltage to and energizes windshield wiper power line 26 at junction point J-4 which charges capacitor 30 through diode 37. Capacitor 30 is discharged across the network created by resistors 31 and 32, which places a positive voltage on the base of transistor 33 and thus turns transistor 33 on. When transistor 33 is on, a voltage drop is created across resistor 34, a ground is created through resistor 35 to the base of transistor 36, and transistor 36, is turned on. This activates the vehicle lighting circuit by placing a positive voltage through diodes 38, 39 to the parking light power line junction J-1 and to the headlight power line junction J-2. Dependent on the positioning of switch 22 either the low beam, line 22b, or high beam, line 22a headlights will be turned on. Also to be noted is that lines 20d, 20e and diode 39 may be eliminated if desired so that only the headlights will be energized and not the parking lights.

When the windshield wipers are turned off, the time delay circuit formed by capacitor 30, resistor 31 and resistor 32 continues to hold transistor 33 on for approximately 30 seconds as capacitor 30 discharges. At the end of 30 seconds, the vehicle lights will turn off. Because of this feature, the unit operates properly when installed in automobiles having intermittent or delay-type wiper circuits.

Figure 2:
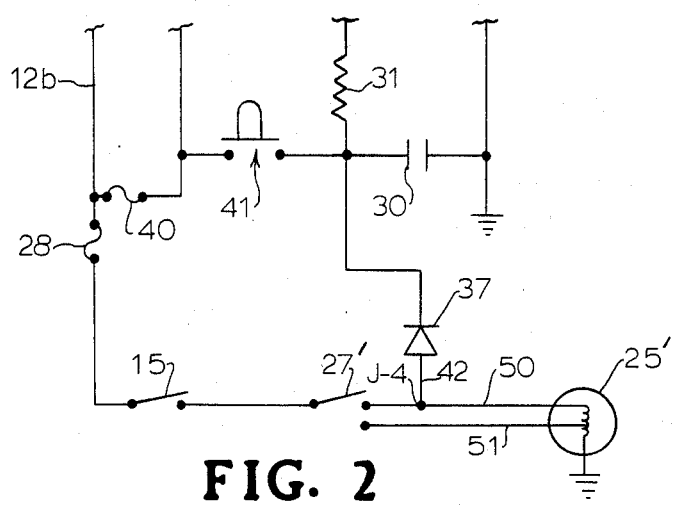
FIG. 2 illustrates in a modification of the Box B circuit of FIG. 1 how the power line is connected for a windshield wiper motor in a vehicle having a two-speed wiper switch.
Figure 3:
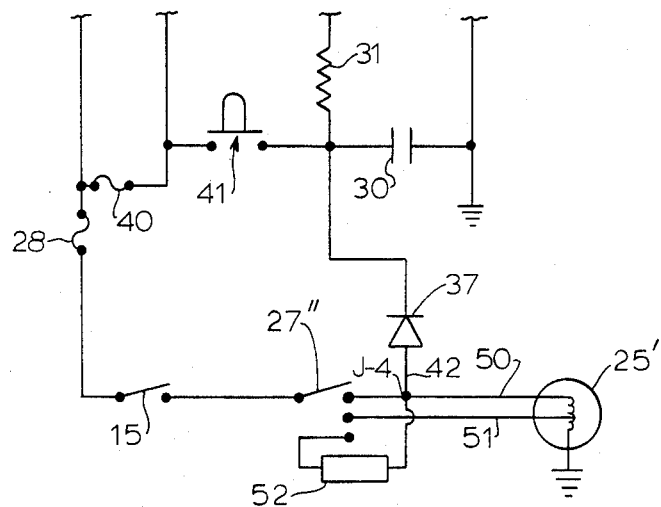
FIG. 3 illustrates in another modification of the Box B circuit of FIG. 1 how the power line is connected for a windshield wiper motor in a vehicle having a two-speed wiper switch with time delay.

Making reference to FIGS. 2 and 3, which correspond to variations of the Box B circuitry of FIG. 1, it will be seen that vehicles having two-speed wiper switches (FIG. 2), or two speed wiper switches with a time delay 52, (FIG. 3) will have a two-speed wiper switch 27' or 27" and both a low speed wiper motor power line 50 and a high speed wiper motor power line 51. In these cases, it is preferred to connect the junction point J-4 on line 42 which charges capacitor 30 to the low speed wiper motor power line 50. This line can be easily identified during installation by turning the windshield wiper on, setting the speed to low, and using a voltage tester to determine which line is active.

Another advantage of the present invention is that the capacitor 30 can be charged, the vehicle lights activated and the 30-second time delay period begun by momentarily depressing switch 41. This allows the vehicle operator a period of illumination, after parking the vehicle at night, to leave the vehicle and enter his or her dwelling. Of course, the time period could be adjusted by changing capacitor 30, or by providing several capacitors in series and a switch to select the capacitor providing the time period desired. Pushbutton switch 41 also serves as a test switch for the invention circuitry.

It has been found that the unit works well when the circuitry is assembled on a heat sink and mounted on the firewall of the vehicle inside the engine compartment. Pushbutton switch 41 may be separately mounted on the dashboard of the vehicle, or in any other similarly convenient location. Connections to power lines 12a, 12b, parking light power line 20, headlight power line 21 and windshield wiper power line 26 in the embodiment of FIG. 1 are easily made with self-stripping connectors.

Figure 4:
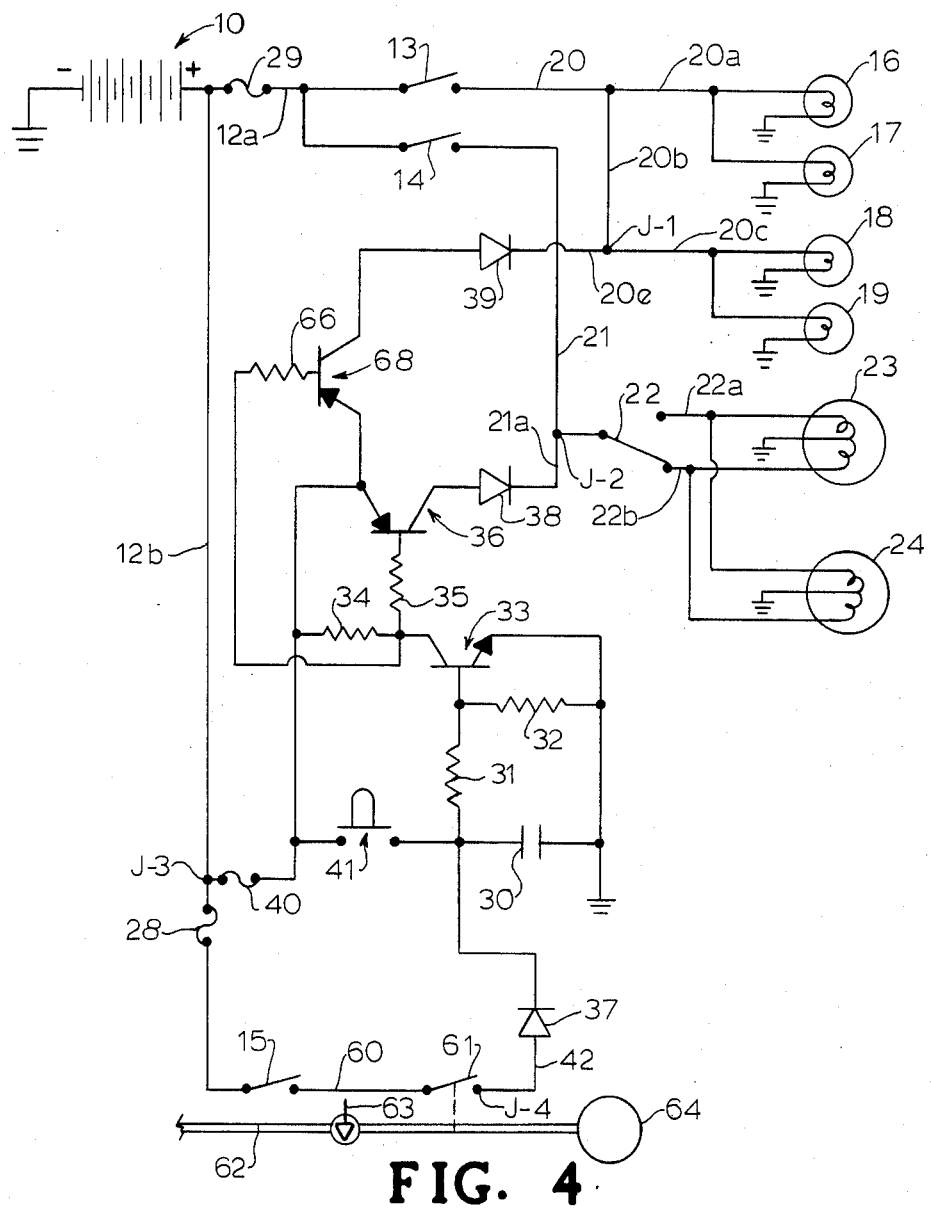
FIG. 4 depicts the circuitry of the invention similar to FIG. 1, but modified for use with large trucks having pneumatic wipers.

FIG. 4 illustrates the invention as applied to large trucks having pneumatic wipers. The FIG. 4 circuitry will be noted as being generally similar in construction and operation to the circuitry of FIG. 1 except that in a vehicle having pneumatic rather than electric wipers a pressure actuated switch 61 is mounted in the windshield wiper air line 62 between the conventional windshield wiper air control valve 63 and the pneumatic windshield wiper motor 64. Power to the switch is supplied from electric line 60 which is energized through the ignition switch 15. Alternatively, power to the pressure-actuated switch 61 could be drawn directly from the main power line 12b. Once the air-actuated switch 61 is closed by pressure in the windshield wiper air line 62, power is supplied to capacitor 30 and the base of transistor 33 in the same manner as described with reference to FIG. 1 above.

In addition to the just-described modification, a second 150 ohm resistor 66 and a second 160 watt, 20 ampere PNP transistor 68 are provided for the FIG. 4 embodiment. Resistor 66 is connected between the bases of transistor 36 and 68. When pressure-actuated switch 61 is closed and transistor 33 is turned on, the voltage drop across resistor 34 places a ground through both resistor 35 and 66 to the bases of both transistor 36 and 68. Power is then provided through transistor 68 to the parking light power line 20a and junction J-1 and through transistor 36 to the headlight power line 21a and junction J-2.

From the foregoing, it can be seen that the invention circuitry provides a much needed safety mechanism which ensures that the vehicle's headlights will always be on when the windshield wipers are on. Nevertheless, the invention circuitry also enables the headlights and parking lights to be operated in the conventional manner when the windshield wiper is not needed. While primarily directed to safety considerations, the invention circuitry also provides through pushbutton switch 41 a conventional means for providing light for a short interval when needed.

What is claimed is:

1. Circuitry operative for automatically operating the headlights of a motor vehicle whenever the windshield wiper of the motor vehicle is operated, said vehicle being of the type having a battery with positive and negative sides, a windshield wiper and a connection point which develops a voltage established by one side of said battery dependent upon said wiper being on, headlights and connection means for energizing said headlights from the same said one side of said battery, said circuitry comprising:

(a) first circuit means for detecting said wiper connection point voltage and providing a control voltage upon activation of said windshield wiper, said first circuit means including an NPN transistor, the base of said NPN transistor being connected to said connection point, the collector of said NPN transistor being connected to said one side of said battery, and the emitter of said NPN transistor being connected to the opposite side of said battery;

(b) second circuit means connected to said first circuit means including power switching means responsive to said control voltage, said second circuit means being connected between said one side of said battery and said headlight connection means so that a closed circuit between said one side of said battery through said headlights to the opposite side of said battery exists for at least as long as said control voltage is detected by said second circuit means; and (c) a capacitative circuit connected to said first circuit means, said capacitative circuit being connected to be charged by said connection point voltage upon the activation of said windshield wiper to provide a second control voltage to said second circuit means upon said windshield wiper being turned off for so long as is required for said capacitative circuit to discharge to thereby maintain said headlights on for an equal corresponding length of time.

2. Circuitry as claimed in claim 1 including a switch connected between said one side of said battery and said capacitative circuit and operative when closed to provide a momentary current to said capacitative circuit to charge said capacitative circuit enabling said second control voltage to be generated without requiring the operation of said windshield wiper.

3. Circuitry as claimed in claim 1 wherein said wiper comprises a pneumatic wiper and said connection point comprises a pressure-actuated switch point.

4. Circuitry operative for automatically operating the headlights of a motor vehicle whenever the windshield wiper of the motor vehicle is operated either continuously or intermittently, said vehicle being of the type having a battery with positive and negative sides, a windshield wiper and a connection point which develops a voltage established by one side of said battery dependent upon said wiper being on at least intermittently, headlights and connection means for energizing said headlights from the same said one side of said battery, said circuitry comprising:

(a) first circuit means for detecting said wiper connection point voltage and providing a continuous control voltage upon activation of said windshield wiper for either continuous or intermittent operation; and (b) second circuit means connected to said first circuit means including power switching means responsive to said control voltage, said second circuit means being connected between said one side of said battery and said headlight connection means so that a closed circuit between said one side of said battery through said headlights to the opposite side of said battery exists for at least as long as said control voltage is detected by said second circuit means.

5. Circuitry as claimed in claim 4, including a capacitative circuit connected to said first circuit means, said capacitative circuit being connected to be charged by said connection point voltage upon the activation of said windshield wiper to provide a second control voltage to said second circuit means upon said windshield wiper being turned off for so long as is required for said capacitative circuit to discharge to thereby maintain said headlights on for an equal corresponding length of time.

6. Circuitry operative for automatically operating the headlights of a motor vehicle whenever the windshield wiper of the motor vehicle is operated, said vehicle being of the type having a battery with positive and negative sides, a windshield wiper and a connection point which develops a voltage established by one side of said battery dependent upon said wiper being on, headlights and connection means for energizing said headlights from the same said one side of said battery, said circuitry comprising:

(a) first circuit means for detecting said wiper connection point voltage and providing a control voltage upon activation of said windshield wiper;

(b) second circuit means connected to said first circuit means including power switching means responsive to said control voltage, said second circuit means being connected between said one side of said battery and said headlight connection means so that a closed circuit between said one side of said battery through said headlights to the opposite side of said battery exists for at least as long as said control voltage is detected by said second circuit means; and (c) a capacitative circuit connected to said first circuit means, said capacitative circuit being connected to be charged by said connection point voltage upon the activation of said windshield wiper to provide a second control voltage to said second circuit means upon said windshield wiper being turned off for so long as is required for said capacitative circuit to discharge to thereby maintain said headlights on for an equal corresponding length of time.

7. Circuitry as claimed in claim 6 including a switch connected between said one side of said battery and said capacitative circuit and operative when closed to provide a momentary current to said capacitative circuit to charge said capacitative circuit enabling said second control voltage to be generated without requiring the operation of said windshield wiper.

8. Circuitry as claimed in claim 6 wherein said wiper comprises a pneumatic wiper and said connection point comprises a pressure-actuated switch point.

9. Circuitry as claimed in claim 7 wherein said first circuit means includes an NPN transistor, the base of said NPN transistor being connected to said connection point, the collector of said NPN transistor being connected to said one side of said battery, and the emtiter of said NPN transistor being connected to the opposite side of said battery.

10. Circuitry as claimed in claim 9 wherein said power switching means comprises a PNP transistor whose base is connected to the collector of said NPN transistor in a voltage network arranged so that when said NPN transistor is activated by said connection point voltage the base of said PNP transistor is energized in a manner enabling power to flow from said battery through said PNP transistor to said headlights.

11. Circuitry operative for automatically operating the headlights of a motor vehicle whenever the windshield wiper of the motor vehicle is operated, said vehicle being of the type having a battery with positive and negative sides, a pneumatic windhsield wiper and a pressure-actuated connection point which develops a voltage established by one side of said battery dependent upon said wiper being on, headlights and connection means for energizing said headlights from the same said one side of said battery, said circuitry comprising:

(a) first circuit means for detecting said pneumatic wiper pressure-actuated connection point voltage and providing a control voltage upon activation of said windshield wiper; and (b) second circuit means connected to said first circuit means including power switching means responsive to said control voltage, said second circuit means being connected between said one side of said battery and said headlight connection means so that a closed circuit between said one side of said battery through said headlights to the opposite side of said battery exists for at least as long as said control voltage is detected by said second circuit means.

* * * * *